United States Patent
Bahl et al.

(10) Patent No.: US 8,448,453 B2
(45) Date of Patent: May 28, 2013

(54) REFRIGERATION DEVICE AND A METHOD OF REFRIGERATING

(75) Inventors: Christian R. H. Bahl, Taastrup (DK); Anders Smith, Birkerod (DK); Nini Pryds, Dragor (DK); Luise T. Kuhn, Fredensborg (DK); Soren Linderoth, Roskilde (DK)

(73) Assignee: The Technical University of Denmark, Lyngby (DK)

( * ) Notice: Subject to any disclaimer, the term of this patent is extended or adjusted under 35 U.S.C. 154(b) by 450 days.

(21) Appl. No.: 12/673,707

(22) PCT Filed: Jul. 15, 2008

(86) PCT No.: PCT/EP2008/059225
§ 371 (c)(1),
(2), (4) Date: Mar. 24, 2010

(87) PCT Pub. No.: WO2009/024412
PCT Pub. Date: Feb. 26, 2009

(65) Prior Publication Data
US 2011/0239662 A1    Oct. 6, 2011

Related U.S. Application Data

(60) Provisional application No. 60/956,615, filed on Aug. 17, 2007.

(51) Int. Cl.
*F25B 21/00*    (2006.01)
(52) U.S. Cl.
USPC .................................. 62/3.1; 62/3.3
(58) Field of Classification Search
USPC .............. 62/3.1, 3.3; 165/135; 29/890.03
See application file for complete search history.

(56) References Cited

U.S. PATENT DOCUMENTS

| | | | | | |
|---|---|---|---|---|---|
| 4,916,907 | A | * | 4/1990 | Munk et al. | 62/3.1 |
| 5,091,361 | A | * | 2/1992 | Hed | 505/163 |
| 5,465,781 | A | * | 11/1995 | DeGregoria | 165/8 |
| 6,332,323 | B1 | * | 12/2001 | Reid et al. | 62/6 |

(Continued)

FOREIGN PATENT DOCUMENTS

| EP | 1 736 717 | 12/2005 |
|---|---|---|
| JP | 2006-308197 | 11/2006 |

(Continued)

OTHER PUBLICATIONS

International. Search Report for PCT/EP2008/059225.

(Continued)

*Primary Examiner* — Mohammad Ali
(74) *Attorney, Agent, or Firm* — Pillsbury Winthrop Shaw Pittman LLP

(57) ABSTRACT

The invention provides a refrigeration device, comprising: a magnetic field source; a magnetocaloric bed, one of the magnetocaloric bed and the magnetic field source being arranged to substantially surround the other, the magnetocaloric bed being arranged for relative rotation with respect to the magnetic field source such that during said relative rotation, the magnetic field experienced by parts of the magnetocaloric bed varies; plural pathways formed within the magnetocaloric bed for the flow of a working fluid during the relative rotation between the magnetocaloric bed and the permanent magnet; and a flow distributor placed at each end of the magnetocaloric bed, for controlling the part of the magnetocaloric bed able to receive working fluid during a cycle of operation.

25 Claims, 13 Drawing Sheets

U.S. PATENT DOCUMENTS

| | | | |
|---|---|---|---|
| 6,758,046 B1* | 7/2004 | Barclay et al. | 62/3.1 |
| 6,935,121 B2* | 8/2005 | Fang et al. | 62/3.1 |
| 6,959,554 B1 | 11/2005 | Shirron et al. | |
| 2002/0053209 A1* | 5/2002 | Zimm et al. | 62/3.1 |
| 2003/0218852 A1* | 11/2003 | Minovitch | 361/146 |
| 2004/0093877 A1* | 5/2004 | Wada et al. | 62/114 |
| 2005/0012072 A1 | 1/2005 | Bailey, III et al. | |

FOREIGN PATENT DOCUMENTS

| | | |
|---|---|---|
| WO | WO 01/33145 | 5/2001 |
| WO | WO 02/12800 | 2/2002 |
| WO | WO 2005/095872 | 10/2005 |

OTHER PUBLICATIONS

Okamura et al.; "Performance of a room temperature rotary magnetic refrigerator"; International Journal of refrigeration. Elsevier, Paris, France, vol. 29, No. 8, Nov. 22, 2006, pp. 1327-1331, XP005775734.

International Preliminary Examination Report for PCT/EP2008/059225 dated Mar. 4, 2010.

* cited by examiner

REFRIGERATION DEVICE AND A METHOD OF REFRIGERATING

CROSS-REFERENCE TO RELATED APPLICATIONS

This is the U.S. National Stage of PCT/EP2008/059225, filed Jul. 15, 2008, which in turn claims priority to U.S. Provisional Patent Application No. 60/956,615, filed Aug. 17, 2007, the entire contents of all applications are incorporated herein by reference in their entireties.

The present invention relates to a refrigeration device and a method of refrigerating.

It is known to use magnetocaloric materials in a refrigerator. Indeed, a suitable method of manufacture of a magnetocaloric component for use in a refrigerator is described in detail in our co-pending patent application no. PCT/EP2005/013654. In a magnetic refrigerator, use is made of the so-called active magnetic regeneration (AMR) cycle in which a working fluid or refrigerant is subjected to repeated heating and cooling by an active regenerator made of a magnetocaloric material.

The active regenerator is exposed to a varying magnetic field which causes it to heat up and cool down in relation to the strength of the field applied at any instant in time. The working fluid is coupled thermally to the active regenerator and with the use of a hot side and cold side heat exchanger, refrigeration is possible.

To take full advantage of the magnetocaloric effect requires the use of high magnetic fields e.g. above 0.5 tesla. In addition the frequency of the AMR cycle must be sufficiently high, e.g. about 1 Hz to have a significant cooling power. The magnetic field source is often the most expensive component of an AMR device, and to ensure its optimal utilization, preferably the volume in which the magnetic field exists should be used continuously during operation of the device.

Various designs and configuration have been proposed for a magnetic refrigerator. One such example is described in WO-A-2005/095872. This application describes a heat generator comprising a magnetocaloric material. The system includes magnetocaloric thermal elements arranged in a circular configuration and being crossed by conduits containing a flowing coolant. It is stated that the device can be used for tempering, cooling, heating, conserving, drying and air-conditioning. Other examples of magnetic refrigerators are described in EP-A-1,736,717, WO-A-02/12800 and US-A-2005/120720.

However, improvements to such devices are desired to allow for high-frequency, continuous operation with full utilization of both magnetic field volume and active regenerator. The pressure loss in the fluid flow should be as low as possible. In addition, simplification of the fluid flow control system of previous devices is desired.

According to a first aspect of the present invention, there is provided a refrigeration device, comprising a magnetic field source; a magnetocaloric bed, one of the magnetocaloric bed and the magnetic field source being arranged to substantially surround the other, the magnetocaloric bed being arranged for relative rotation with respect to the magnetic field source such that during said relative rotation, the magnetic field experienced by parts of the magnetocaloric bed varies; plural pathways formed within the magnetocaloric bed for the flow of a working fluid during the relative rotation between the magnetocaloric bed and the permanent magnet. A flow distributor is preferably placed at each end of the magnetocaloric bed, for controlling the part of the magnetocaloric bed able to receive working fluid during a cycle of operation.

Since one of the magnetic field source and the magnetocaloric bed is configured to substantially surround the other, i.e. they have substantially the same longitudinal axis, or are substantially coaxial or concentric, relative rotation of the two components together with the configuration of the magnetic field source enables a continually varying magnetic field to be applied to each section or part of the magnetocaloric bed during a cycle of relative rotation. It is preferred that the magnetic field source is stationary and the magnetocaloric bed rotates around it. In other words, the magnetic field source may form a rod on which the cylinder of the magnetocaloric bed can rotate. This arrangement can of course be reversed.

It will be appreciated that the refrigeration device can also be used as a heat pump. In use, the device becomes hot at one end and cold at the other. When used as a refrigerator, the hot end is kept in contact with the surroundings and the cold end is used to refrigerate. Alternatively the device may be used as a heat pump in which the cold end is kept in contact with the surroundings and the hot end used to heat.

Preferably, each of the magnetocaloric bed and the magnetic field source are substantially cylindrical in form such that one cylinder can be arranged inside the other for relative rotation between the two about a substantially shared longitudinal axis.

In an embodiment, the refrigeration device comprises: a magnetic field source having a longitudinal axis; a magnetocaloric component in the form of a cylinder having a longitudinal axis substantially parallel to that of the magnetic field source, the magnetocaloric component being arranged for relative rotation with respect to the magnetic field source around its longitudinal axis such that during said relative rotation the magnetic field experienced by parts of the magnetocaloric component varies; plural pathways formed within the magnetocaloric component for the flow of a working fluid during the relative rotation between the magnetocaloric component and the magnetic field source; and one or more flow distributors allowing a uniform flow of the working fluid.

In a preferred embodiment the magnetic field source is a permanent magnet or assembly of permanent magnets or an assembly of permanent magnets in combination with one or more electromagnets or solenoids. The magnetic field source is designed to have substantially all of the magnetic field strength confined to equidistant arc sections along the cylindrical magnetocaloric bed. The source may be a dipole or have a higher number of poles (quadropole, octopole, etc.), according to the required ratio of AMR frequency to the rotational frequency of the bed.

The refrigeration device provides a rotary magnetic refrigeration apparatus that magnetises and demagnetises the magnetocaloric bed by a rotary movement and that can operate continuously over the cycle of rotation of the magnetic field source relative to the magnetocaloric bed. Thus the device is a continuous variable frequency magnetic refrigeration apparatus that magnetises and demagnetises the magnetocaloric bed, in one particular embodiment, by a rotary movement of a cylindrical magnetocaloric bed placed concentrically around a permanent magnet assembly.

Preferably, the permanent magnet assembly is maintained stationary and the magnetocaloric bed is made to rotate around it. This provides the advantage that flow distributors, fixed relatively to the permanent magnet assembly, may be designed such that each flow opening or flow channel to and from the magnetocaloric bed will only experience unidirectional flow (a given opening always experiencing either flow from hot to cold or from cold to hot), thus obviating the need for rotary valves. In addition this ensures continuous operation of the device without having to reverse the direction of flow of working fluid within the channels to and from the device during the cycle. Furthermore, since the permanent magnet assembly will be stationary in relation to a yoke which is preferably provided around the magnetocaloric bed, no electrical currents will be induced within the yoke.

Flow distributors with a number of flow openings or channels equal to twice the number of poles of the magnetic field source are placed at both ends of the substantially cylindrical magnetocaloric bed. Preferably, the flow distributors are fixed relatively to the magnetic field source, such that during the relative rotation of magnetic field source and magnetocaloric bed, different sections of the magnetocaloric bed are swept across the flow openings. The angular extent of the flow openings may be adjusted to change the AMR cycle characteristics. Preferably, hot and cold side heat exchangers are integrated in the flow distributors, allowing for a compact and efficient design.

The relative rotary movement of the magnetocaloric bed and the magnetic field source may be with a constant frequency or a time-varying, possibly stepwise, frequency. A time-varying frequency may be used in conjunction with a bed with a radially varying composition, e.g. compartmentalized along the radial direction. This may be used to optimize the AMR cycle characteristics.

According to a second aspect of the present invention, there is provided a method of refrigeration, comprising: providing a magnetic field source and a magnetocaloric bed, one surrounding the other and being arranged for relative rotation; providing a flow distributor at each end of the magnetocaloric bed for controlling the part of the magnetocaloric bed able to receive working fluid during a cycle of operation; forcing a fluid refrigerant, e.g. a liquid refrigerant, to flow through the flow distributors and the magnetocaloric bed as the magnetic field source and the magnetocaloric bed rotate relative to each other to thereby cause the fluid to be heated or cooled.

According to a third aspect of the present invention, there is provided a refrigeration device, comprising a magnetic field source; a magnetocaloric bed, one of the magnetocaloric bed and the magnetic field source being arranged to substantially surround the other, the magnetocaloric bed being arranged for relative rotation with respect to the magnetic field source such that during said relative rotation, the magnetic field experienced by parts of the magnetocaloric bed varies; plural pathways formed within the magnetocaloric bed for the flow of a working fluid from one end of the bed to the other during the relative rotation between the magnetocaloric bed and the permanent magnet.

According to a further aspect of the present invention, there is provided a heat pump, the heat pump comprising a refrigeration device according to the first or third aspects of the present invention, arranged to provide heat from a hot end thereof.

Examples of embodiments of the present invention will now be described in detail with reference to the accompanying drawings in which.

Figure 1A:
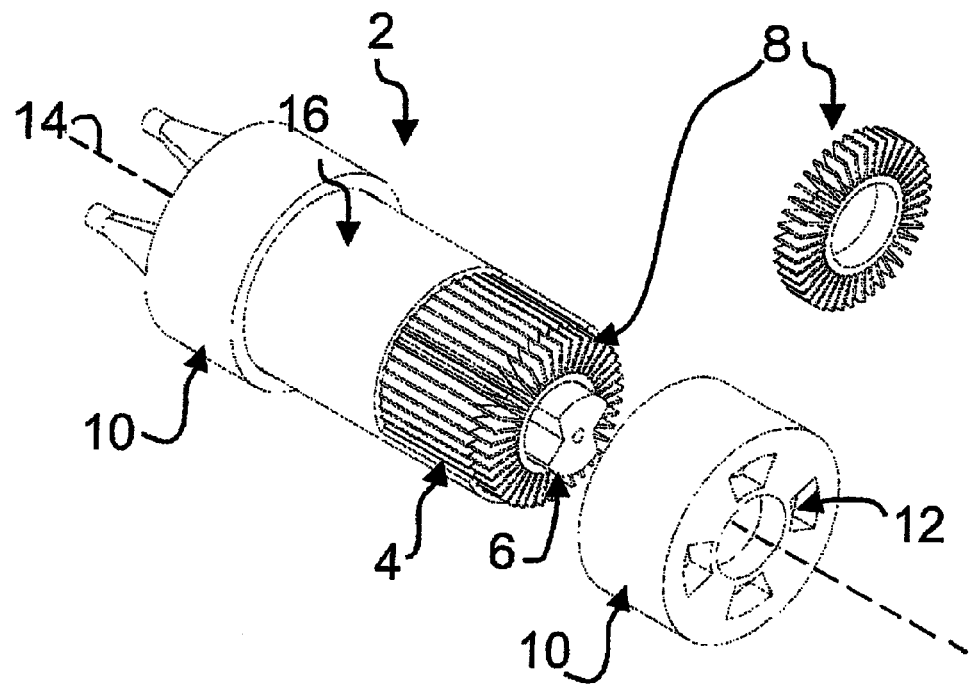
FIG. 1A is a schematic representation of a magnetic refrigerator.

FIG. 1A is a schematic representation of a magnetic refrigerator. The magnetic refrigerator 2 comprises a cylindrical magnetocaloric bed 4 surrounding, in this example, a magnetic field source in the form of a permanent magnet 6 having a particular configuration, described in more detail below. The magnetocaloric bed 4 is arranged substantially concentrically around the magnetic field source. The magnetocaloric bed 4 and the magnetic field source are arranged such that rotation of one of the components within the other is achievable, i.e. preferably substantially coaxially. In other words, the longitudinal axis of each of the magnetocaloric bed 4 and the magnetic field source are coincident or at least substantially parallel such that rotation of one of the components within the other is achievable.

The refrigerator 2 comprises flow guides 8 placed directly adjacent to each end of the magnetocaloric bed 4. As will be explained below, the function of the flow guides 8 is to ensure steady, laminar flow in the magnetocaloric bed 4 such that the temperature gradient along the magnetocaloric bed 4 is not lost through mixing. Preferably, the flow guide profile is selected to match that of the magnetocaloric bed 4. The flow guides 8 are attached rigidly, i.e. in a fixed configuration, to the bed.

In addition, flow distributors 10 are provided. The flow distributors 10 include openings 12 through which, in use, a working fluid can pass. The number of openings is equal to twice the number of regions along the radial direction in which there is a magnetic field strength substantially larger than zero. Every second opening experiences fluid flow from hot to cold side, while the other openings experience fluid flow from cold to hot side.

In use, the flow distributors 10 and the flow guides 8 (and hence the bed 4 too) rotate relative to each other. Thus, the section of the magnetocaloric bed 4 which is exposed through the openings 12 varies during a cycle of operation of the device.

In use, the magnetocaloric bed 4 together with the flow guides 8 which are fixedly connected thereto rotate about a longitudinal axis 14. The permanent magnet 6 is fixed as are the flow distributors 10. The combination of flow distributors 10 and rotating magnetocaloric bed 4 and the configuration of the permanent magnet 6, means that each arc section of the bed 4 will experience an active magnetic regeneration (AMR) cycle. During a full revolution of the magnetocaloric bed 4, each arc section of the magnetocaloric bed 4 evidently experiences a number of AMR cycles equal to the number of magnetic field regions. Thus, the AMR cycle frequency may be substantially higher than the frequency of revolution of the bed.

The permanent magnet 6 in the example shown consists of a number of long permanent magnet segments each covering a certain arc on the inside of the cylinder of the magnetocaloric bed 4. The spaces in between the permanent magnet segments are either left empty or filled with non-magnetic material.

A yoke 16 of a soft, high permeability ferromagnetic material is preferably placed around the outside of the magnetocaloric bed 4. The yoke functions as a return path for the magnetic flux of the permanent magnet 6. In addition, it shields any stray fields such that the internal magnetic field does not penetrate beyond the apparatus 2.

Another embodiment of the permanent magnet array may include permanent magnet blocks protruding from a non-magnetic cylinder placed concentrically within the magnetocaloric cylinder bed 4. These would be connected pair-wise by arc shaped blocks of a soft, high-permeability ferromagnetic material, fixed to the central non-magnetic cylinder. It will be appreciated that a permanent magnet or a permanent magnet assembly is a preferred example of a source of magnetic field. Any other suitable source could be used, e.g. an appropriately connected solenoid could be arranged to provide the magnetic field.

In another embodiment, the yoke includes a segmented yoke as will be explained below in connection with FIG. 8.

The arrangement of a magnetic field source such as a permanent magnet and a magnetocaloric component in the form of a cylinder effectively nested on the magnetic field source enables a continuous, variable frequency rotary magnetic refrigeration apparatus to be realised. The apparatus magnetises and de-magnetises the magnetocaloric material during the relative rotary movement. This therefore has the effect of periodically raising or lowering the temperature within the magnetocaloric bed. As the temperature rises within any section or part of the magnetocaloric bed, working fluid within that section or part is heated. Correspondingly, the working fluid is cooled, when the temperature of the bed is lowered.

By forcing the cooled working fluid through the bed 4 in the direction of hot side to cold side, and forcing the heated working fluid through the bed 4 in the direction of cold side to hot side, heat may be absorbed from a cold side heat exchanger and expelled to a hot side heat exchanger. Thus, with the use of heat exchangers at the ends of the apparatus 2, a refrigeration cycle may be achieved.

Figure 1A:
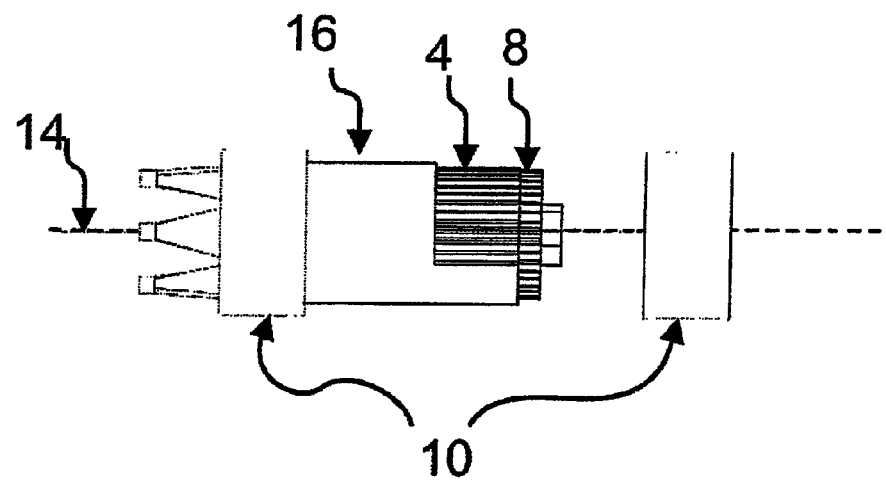
Figure 1B:
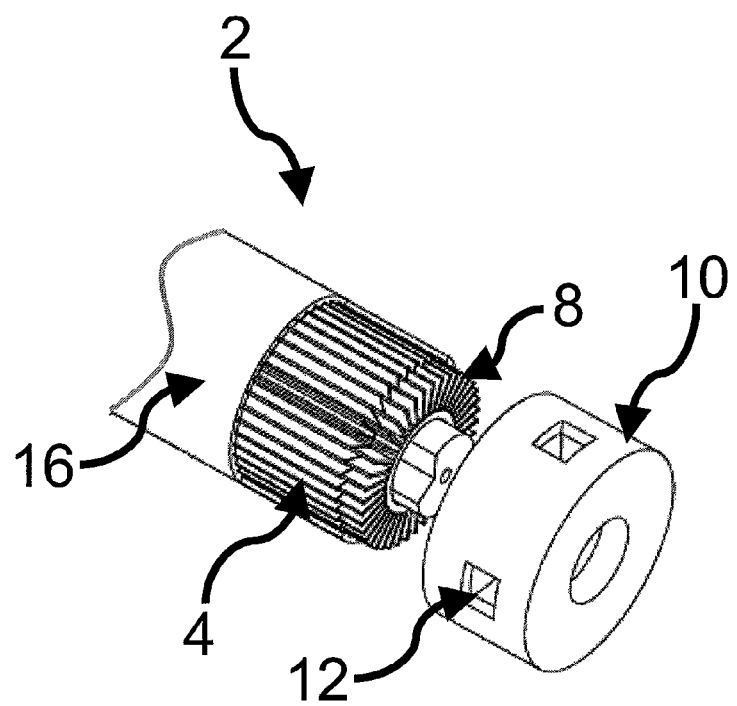
FIG. 1B is a schematic representation of a magnetic refrigerator.

FIG. 1B shows another example of a magnetic refrigerator. In this example, like the example of FIG. 1A, a cylindrical magnetocaloric bed is provided surrounding a magnetic field source. Flow distributors 10 are provided but in this case the openings are provided in the (in this example) cylindrical side walls of the flow distributors. Again, in use the flow distributors and the flow guides 8 rotate relative to each other such that the section of the cylindrical magnetocaloric bed 4 which is in proximity to the openings varies during the cycle of rotation such that each arc section of the bed 4 will experience an AMR cycle.

The refrigeration device may be used to provide heat or refrigeration. In normal use, the device becomes hot at one end and cold at the other. If the hot end is kept in contact with the surroundings the cold end may be used to refrigerate. Alternatively the cold end may be kept in contact with the surroundings and the hot end used to heat.

Figure 2:
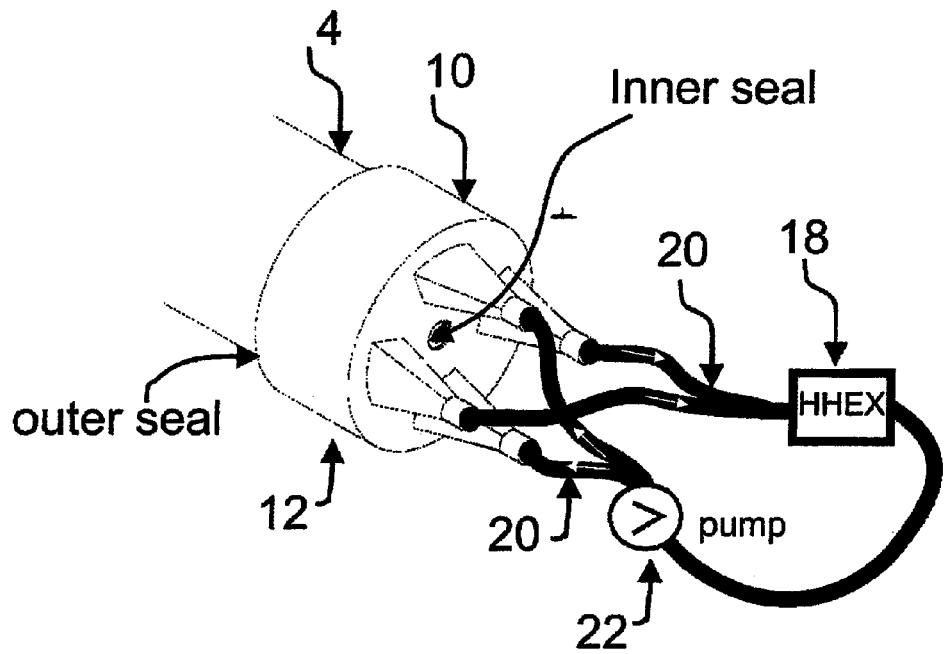
FIG. 2 is a schematic representation of a magnetic refrigerator with additional components shown as compared to the example of FIG. 1.

FIG. 2 shows a schematic representation of the refrigeration device. In the example shown, a hot side heat exchanger 18 is provided connected to the openings 12 of the end plates 10 via tubing 20. A pump 22 is provided to pump a working fluid or refrigerant through the magnetocaloric bed 4. Similarly, although not shown in FIG. 2, a cold side heat exchanger will typically be provided at the opposite end of the device 2.

In another embodiment, it is possible that the magnetocaloric bed 4 is maintained stationary about the axis 14 and the permanent magnet 6 is rotated. What is important is that there is relative rotation between the magnet 6 and the magnetocaloric bed 4 such that the magnetic field applied to elements within the magnetocaloric bed 4 varies with time during a cycle of relative rotation. In the case of the magnetic field source 6 rotating, the yoke and magnet will preferably be segmented or laminated by standard procedures to minimize the induced electrical currents in the magnet and the yoke.

Figure 3:
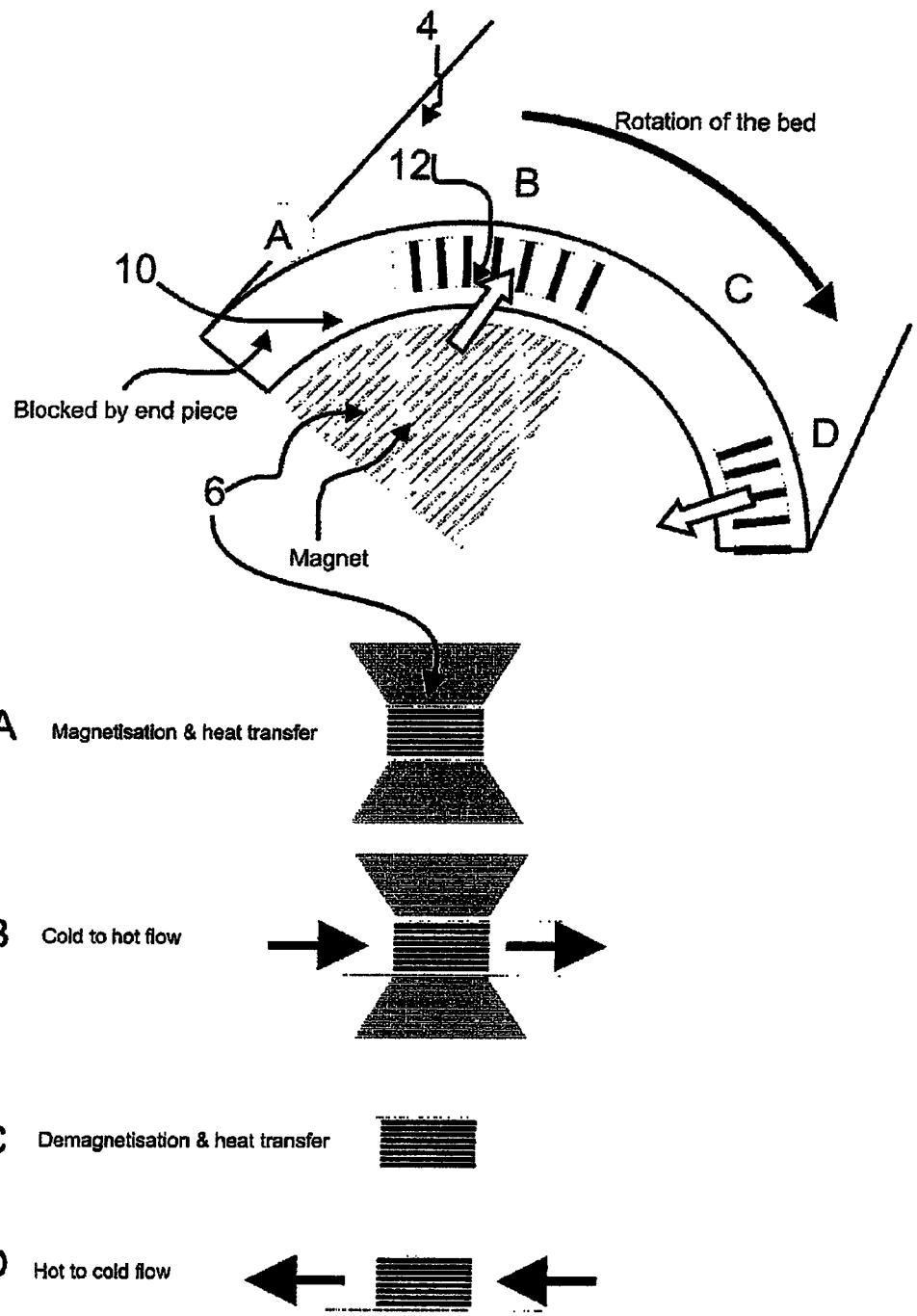
FIG. 3 shows an example of an active magnetic refrigeration cycle experienced by a single plate within the refrigerator.

FIG. 3 shows a schematic representation of an AMR cycle as experienced by a single arc section (plate in this particular example) within the magnetocaloric bed 4. It will be appreciated that as the magnetocaloric bed 4 rotates relative to the permanent magnet, arranged in this example at its core, due to the shape and configuration of the magnet 6, the magnetic field that any particular sector of the magnetocaloric bed 4 experiences will vary during the cycle of rotation.

The combination of flow guides and rotating magnetocaloric component ensures that each arc section of the component 4 will experience an AMR cycle. Thus, even though the fluid flow is continuous and uniform, each arc section will experience alternating flow of the working fluid, separated by periods in which the working fluid is immobile relative to the particular arc section. By varying the ratio of the angular extent of the magnetic field and the angular extent of the openings 12 within the flow distributors 10, the AMR cycle characteristics may be tuned precisely. The required characteristics are found by modelling the cycle with the specific magnet and material properties of the system.

Referring to FIG. 3, in the first stage, the arc section of the magnetocaloric component 4 that is at the position A is exposed to a magnetic field of the permanent magnet 6. This therefore causes an increase in temperature and heat transfer to working fluid that is at that point located within the radial section A. Next, as the magnetocaloric component 4 turns on the axis 14 the part of the magnetocaloric component 4 that was at the position A is now at the position B next to the opening 12 in the end plate 10. Water or whatever working fluid is used is then forced through the opening 12 which displaces the heated fluid from the sector of the magnetocaloric component 4. This is the cold to hot flow of the AMR cycle.

Next, the magnetocaloric component 4 continues to rotate such that the sector in question now occupies the position C. Since this is no longer within the magnetic field of the permanent magnet 6, demagnetisation occurs and the temperature of the elements within the sector of the bed 4 is reduced. During this stage of the cycle the fluid is effectively stuck within the magnetocaloric bed 4 due to the end plate 10 and so it is cooled by the cooling plates. Next, when in the position D, the cooled working fluid is then able to leave the magnetocaloric bed through the opening 12 in the end plate 10. This part of the cycle is the hot to cold flow of the AMR cycle.

Thus, it can be seen that using the configuration of the device shown in FIGS. 1 and 2, a continuous variable frequency rotary magnetic refrigeration apparatus with uniform fluid flow is realised. Furthermore, the direction of flow of working fluid through the openings 12 within the flow distributor 10 does not change so there is no need for any complex valving system. The flow through each of the openings 12 is effectively unidirectional.

Figure 4:
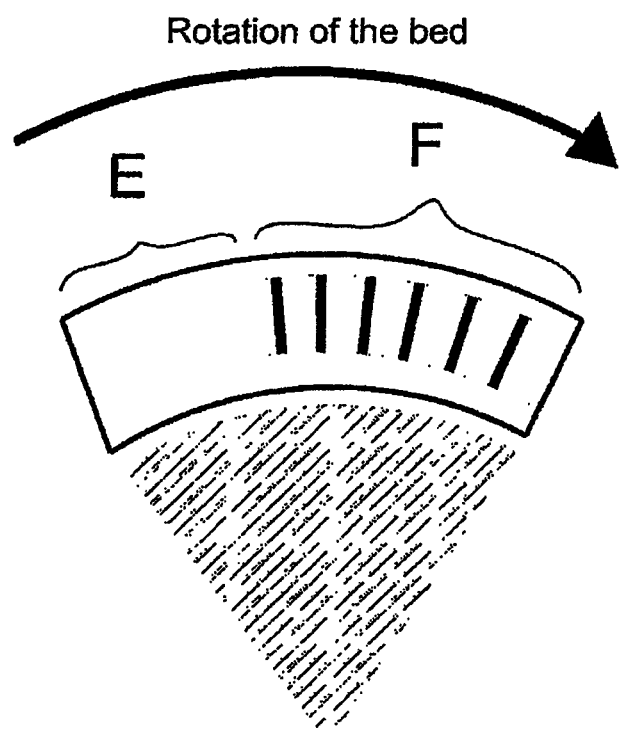
FIG. 4 is a schematic representation of a transverse section through the refrigerator of FIG. 1.
Figure 5:
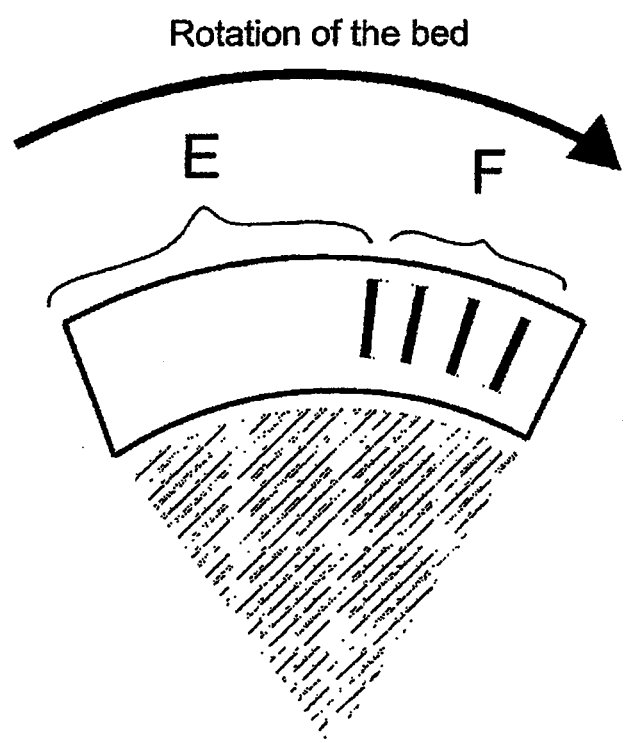
FIGS. 5 to 7 show examples of flow distributors and magnet configurations for use in the refrigerator of FIGS. 1 and 2.
Figure 6:
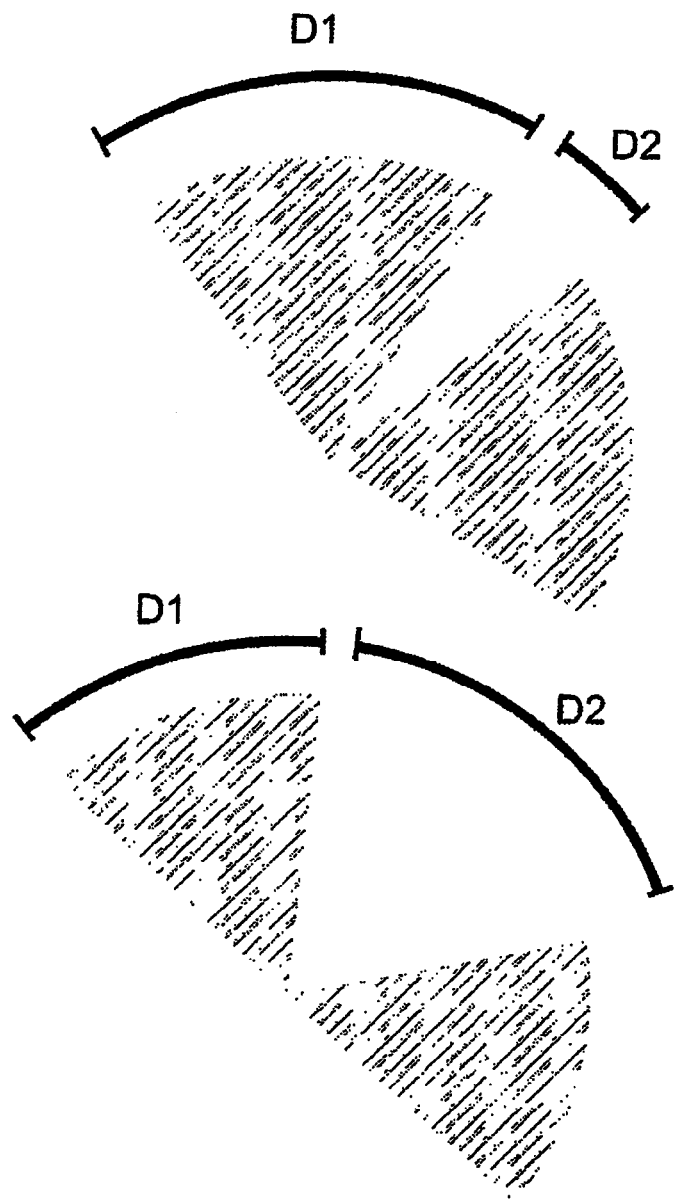

As explained above, the AMR cycle characteristics may be tuned exactly by varying the ratio of the angular extent of a magnetic field region and the angular extent of the flow openings within the flow distributors 10. FIGS. 4 to 6 show examples in which the angular extents of the magnetic field regions are varied and the sizes of the openings for the flow of the working fluid are also varied. In FIG. 4, a short magnetisation time is provided as indicated by the relatively narrow width of the closed section E. In contrast, the opening has a relatively large width as indicated by the label F. In FIG. 5, the proportions are effectively reversed and there is a long magnetisation time and a short flow time. In FIG. 6 it is shown that by adjusting the ratio of the angular extent of a magnetic field region and the angular extent of the no-field (or low-field) region, the ratio of the combination of steps A and B to the combination of steps C and D may be varied. By adjusting the ratio between the angular extent of flow openings for the cold and hot flows respectively, the ratio of steps B and D may be varied. If it is not equal to one, a fraction of the fluid must be diverted around the bed 4 to ensure continuity of flow.

Figure 7:
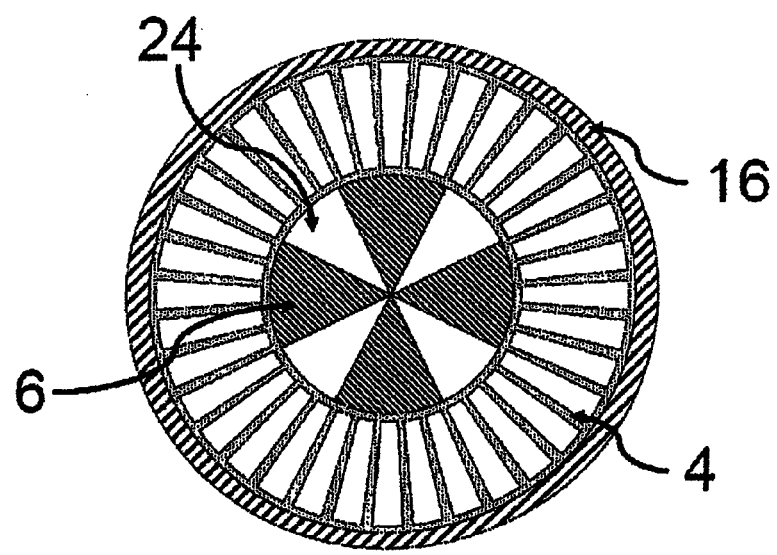

FIG. 7 shows an example of a transverse cross-section through a particular embodiment of a magnetic refrigerator. In the example shown, the permanent magnet 6 has four poles, each covering an arc of a certain angular extent, on the inside of the cylinder defined by the magnetocaloric bed 4. The spaces 24 between the permanent magnet segments are either left empty or filled with non-magnetic material. In the example shown, a yoke of a soft, high-permeability ferromagnetic material is placed outside the magnetocaloric component 4. The yoke 16 functions as a return path for the magnetic flux from the permanent magnet 6 and any suitable material can be used to form the yoke. In addition, the yoke serves to shield any stray fields such that the internal magnetic field does not penetrate beyond the device outer confines. For this particular embodiment of the magnet, flow distributors having eight openings will be needed. In one embodiment, the yoke 16 is made entirely of permanent magnetic material.

The arrangement of the permanent magnet in FIG. 4 is one particular example. In another embodiment, the permanent magnet array may include permanent blocks protruding from a non-magnetic cylinder placed concentrically within the magnetocaloric cylindrical bed. These would preferably be connected pair-wise by arc shaped blocks of a soft, high permeability ferromagnetic material, fixed to the central non-magnetic cylinder. This particular embodiment has the advantage of consisting of simple shapes, making the manufacture cheaper, and of simple assembly, as compared to Halbach-style arrays often used in other designs. However, it will be appreciated that any suitable configuration of a source of magnetic field may be used.

Figure 8:
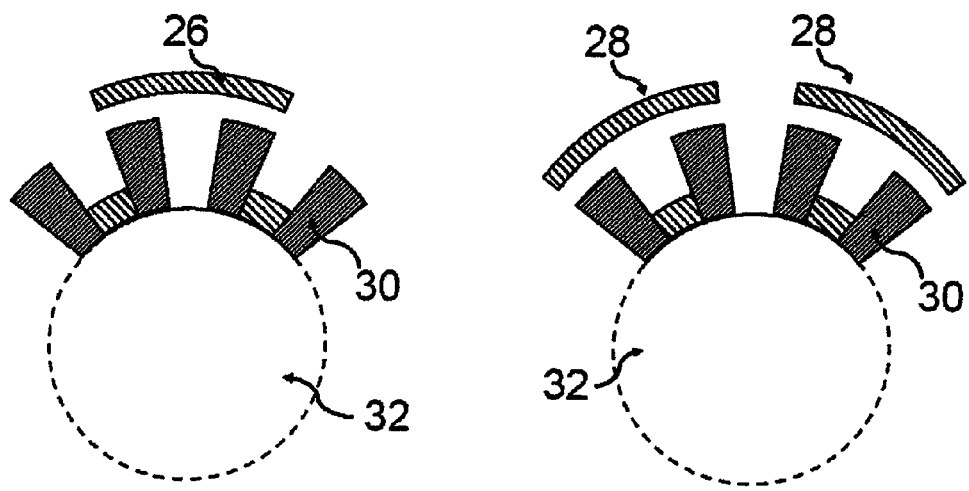
FIG. 8 shows a schematic representation of two embodiments of a segmented yoke.

FIG. 8 shows a schematic representation of a section through a part of a magnetic refrigerator. In these examples, instead of a solid permanent magnet of the type shown in, for example, FIGS. 1 and 2, an arrangement of permanent magnets 30 protruding from a non-magnetic central cylinder 32 is used. Segmented yokes 26 or 28 are provided. The magnetocaloric bed is not shown in these examples but would typically be in cylindrical form between the yokes 26 or 28 and the permanent magnet blocks 30. The permanent magnet blocks 30 are fixed to a central non-magnetic cylinder 32.

It will be appreciated that, like in the examples described above with reference to any of FIGS. 1 to 7, as the magnetocaloric bed (not shown in this example) rotates relative to the central cylinder 32 and the permanent magnets 30 arranged thereon, the magnetic field to which any particular sector of the magnetocaloric bed 4 is exposed will vary during the cycle of rotation thus giving rise to an AMR cycle.

Figure 9:
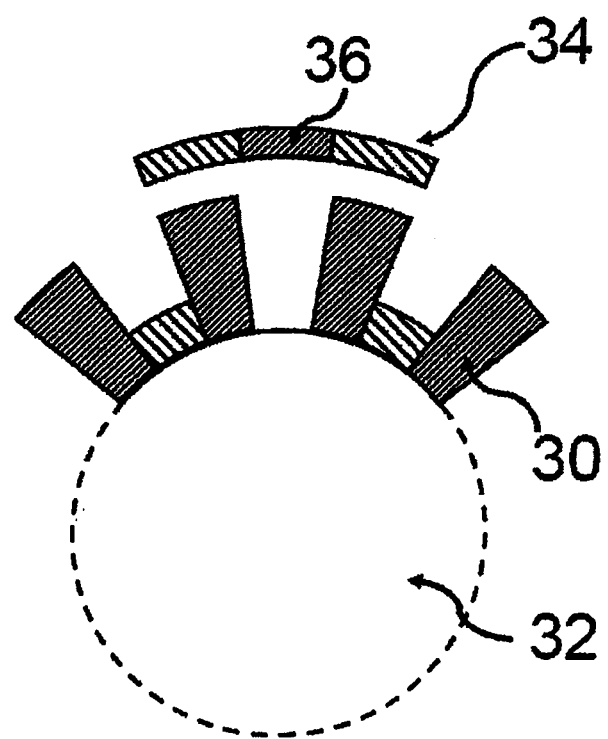
FIG. 9 shows a schematic representation of a segmented yoke.

FIG. 9 shows a further example of a configuration similar to that in FIG. 8. In this case, the yoke 34 is segmented and includes a permanent magnet block 36 incorporated therein. In one embodiment, the entire yoke may be made of permanent magnetic material. In other words, the yoke need not have any soft, high-permeability ferromagnetic material as shown in FIG. 9, but could, for example, be composed entirely of segments of permanent magnetic material and thereby provide an additional or alternative source of magnetic field.

Figure 10:
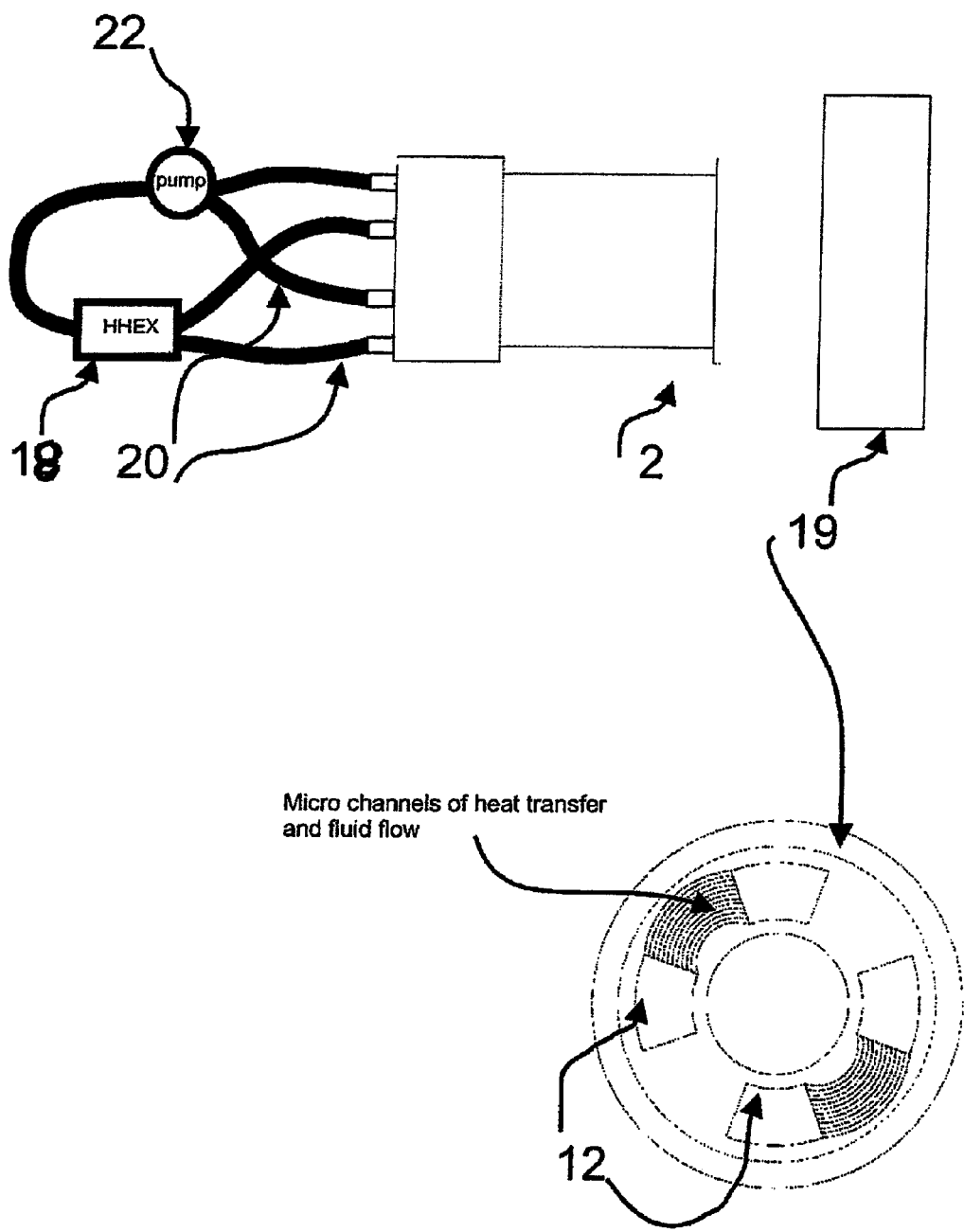
FIG. 10 shows a schematic representation of a refrigerator including heat exchangers.

FIG. 10 shows a schematic representation of a refrigeration system. The system includes a refrigeration device 2 which may be like that shown in any of FIGS. 1 to 9. In addition, a hot side heat exchanger 18 is provided on one side of the refrigeration device 2 and a cold side heat exchanger 19 is provided at the opposite end of the refrigerator 2. The heat exchangers 18 and 19 serve to absorb or expel heat to the surroundings. The hot side heat exchanger 18 is combined with a pump 22 that pumps the working fluid through pipes 20.

As explained above, using the configuration described herein, the flow of fluid within the pipes 20 can be unidirectional. Within the cold side heat exchanger 19, the piping connecting the flow distributor is integrated into the cold side heat exchanger 19. This may be achieved by having a block of, for example, copper with grooves cut into it in order to minimise the flow distance between the regenerator materials and the heat exchanger. These grooves typically branch out so as to maximise the heat exchange.

Figure 11:
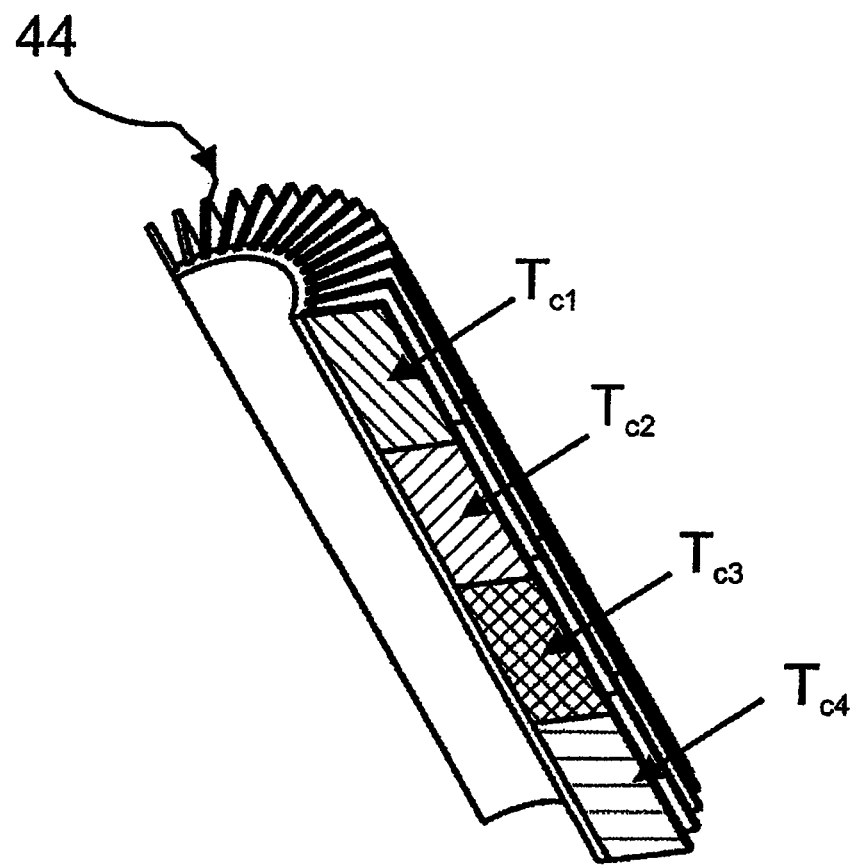
FIG. 11 shows a schematic representation of a magnetocaloric component.

FIG. 11 shows a schematic representation of a section of a magnetocaloric bed. In this example, the bed is made up of plural components each in the form of a radially arranged plate 44. Preferably, the plates are formed having a varying chemical composition along their length such that the magnetic ordering temperature (e.g., the Curie temperature if the materials in question are ferromagnetic) varies along the length of the magnetocaloric bed 4, thereby maximising efficiency and cooling span of the device. The variation may be stepwise, continuous, or a combination of the two. Alternatively, each one of the plates 44 may be made up of a number of smaller component plates. In the example of FIG. 11, the magnetocaloric component is made up of a large number of long, thin magnetocalorically active plates stacked together with constant distance and arranged in a cylindrical shell. The long plates may be compositionally graded along their length or subdivided into several shorter plates with different magnetocaloric properties. Heat is transferred between the regenerator plates and a liquid refrigerant flowing between these.

The spacing between the regenerator plates can be adjusted such as to maximise the rate of transfer of heat whilst maintaining low pressure-loss. Indeed, it is preferred that the structure of the magnetocaloric bed is such as to ensure a high rate of heat transfer whilst minimising pressure loss. This can be achieved by ensuring that there are defined substantially linear paths for the flow of liquid through the magnetocaloric bed.

The dimensions of the regenerator bed, e.g. the ratio between the height of the plates and their length, are chosen such that cooling power, heat loss, and manufacturing expenses are optimized.

The plates are oriented in such a way as to minimise the demagnetisation factor which is significant if the plates are perpendicular to the magnetic field. Since the distance between the plates, if arranged perpendicular to the field, i.e. along a radial direction, is larger at the outer perimeter, the corresponding difference in the ratio of fluid to regenerator material may be compensated by having plates of varying or non-uniform thickness, e.g. increasing slightly in thickness towards the outer perimeter. In other embodiments of the magnetocaloric component, the flow channel width may similarly be varied along the radial direction of the component. In addition the surface of the flow channels may be corrugated or knobbed to increase the surface area and thus the heat transfer between the regenerator and the working fluid.

Figure 12:
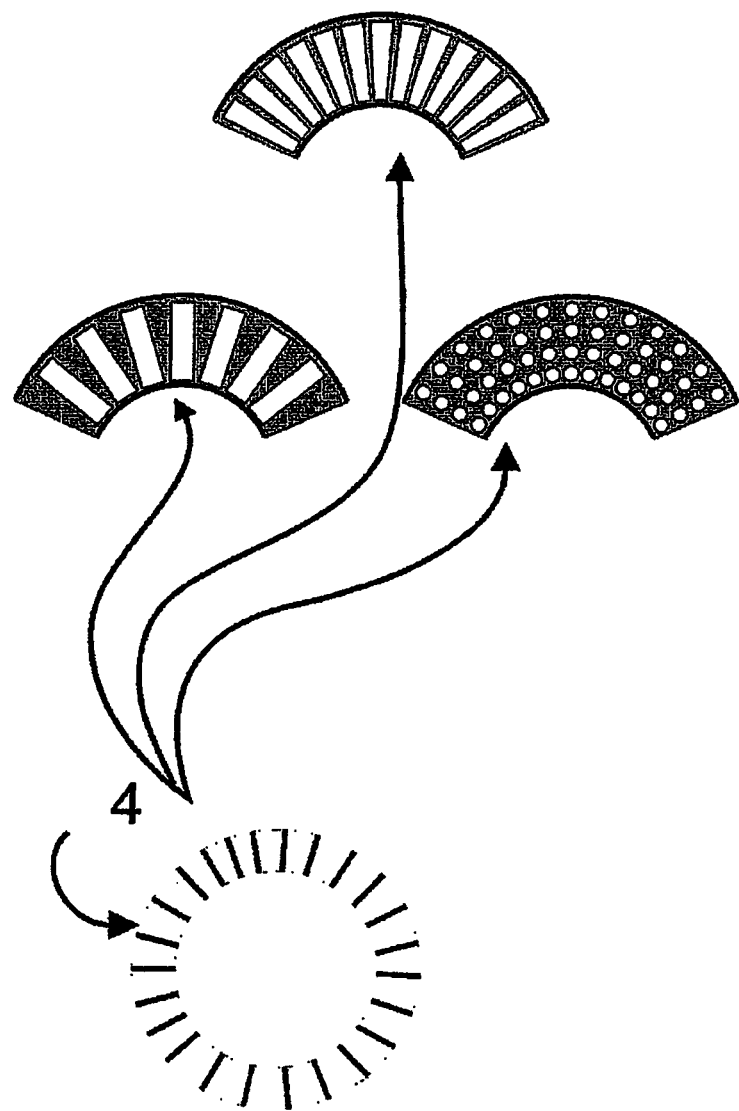
FIG. 12 shows a schematic representation of two examples of a magnetocaloric component.

FIG. 12 shows a number of alternative embodiments for the magnetocaloric component 4. Indeed, in another embodiment, thermally insulating elements are placed regularly around the cylindrical shell, creating separate compartments of magnetocaloric plates. In yet another embodiment, the magnetocaloric component 4 is a monolithic component produced by extrusion or stamping of a green (un-fired) paste or by pressing of a dry powder of magnetocaloric materials, possibly followed by sintering.

A suitable method of manufacture is described in detail in our co-pending patent application no. PCT/EP2005/013654. An advantage of the embodiments shown in FIG. 12 is the ease of assembly and the flexibility in flow travel design. In one example in FIG. 12, the channels for the flow of the working fluid are effectively long tubes formed within the magnetocaloric bed. In another example, the channels for the flow of working fluid are effectively elongate openings within the bed 4, the openings having rectangular or trapezoidal cross-sections. It will be appreciated that any suitable configuration for the magnetocaloric component 4 may be used.

While the present invention has been described with respect to specific embodiments and applications thereof, numerous alternatives, modifications, and applications, and variations will be apparent to those skilled in the art having read the foregoing description. The invention is intended to embrace those alternatives, modifications, and variations as fall within the broad scope of the appended claims. Accordingly, the scope of the invention should be limited only by the attached claims.

The invention claimed is:

1. A refrigeration device, comprising:
   a magnetic field source;
   a magnetocaloric bed, one of the magnetocaloric bed and the magnetic field source being arranged to substantially surround the other, the magnetocaloric bed being arranged for relative rotation with respect to the magnetic field source such that during said relative rotation, the magnetic field experienced by parts of the magnetocaloric bed varies;
   plural pathways formed within the magnetocaloric bed for the flow of a working fluid during the relative rotation between the magnetocaloric bed and the permanent magnet; and
   a flow distributor placed at each end of the magnetocaloric bed, for controlling the part of the magnetocaloric bed able to receive working fluid during a cycle of operation wherein each flow distributor has at least two openings and is fixed with respect to the magnetic field source such that as the magnetocaloric component moves relative to the flow distributors, the part of the magnetocaloric bed exposed to the openings changes wherein the flow through each of the openings is unidirectional.

2. The refrigeration device according to claim 1, wherein the magnetocaloric bed is cylindrical in form.

3. The refrigeration device according to claim 1, wherein the magnetic field source includes at least one permanent magnet.

4. The refrigeration device according to claim 1, wherein the magnetic field source is arranged within the magnetocaloric bed such that the magnetocaloric bed rotates around the magnetic field source.

5. The refrigeration device according to claim 1, wherein the magnetic field source has a shape such as to cause the variation in magnetic field during the relative rotation between the magnetic field source and the magnetocaloric bed.

6. The refrigeration device according to claim 1, wherein the pathways within the magnetocaloric bed are substantially parallel to the longitudinal axis of the magnetocaloric bed.

7. The refrigeration device according to claim 6, wherein the magnetocaloric bed is made up of plural radially spaced plates of magnetocaloric material such that the pathways are defined by gaps between adjacent pairs of plates.

8. The refrigeration device according to claim 1, wherein the magnetic ordering temperature of the magnetocaloric bed varies along the length of device.

9. The refrigeration device according to claim 8, further comprising flowguides fixedly mounted to the magnetocaloric bed between the magnetocaloric bed and the flow distributors to ensure steady laminar flow of working fluid into the bed through the openings in the flow distributors.

10. The refrigeration device according to claim 1, wherein the magnetic field source is made up of plural long permanent magnet segments each covering an arc on the inner surface of the cylindrical magnetocaloric bed.

11. The refrigeration device according to claim 1, comprising a yoke arranged with respect to the magnetocaloric component to act as a return path for magnetic flux.

12. The refrigeration device according to claim 11, wherein the yoke contains at least one permanent magnet.

13. The refrigeration device according to claim 1, wherein the angular size of the openings is selected to define the AMR cycle characteristics.

14. The refrigeration device according to claim 1, wherein the width of the plural pathways of the magnetocaloric bed varies along the radial direction.

15. The refrigeration device according to claim 1, wherein the surface of the plural pathways is uneven.

16. The refrigeration device according to claim 15, wherein the surface of the plural pathways is corrugated or knobbed.

17. The refrigeration device according to claim 1, comprising a hot side heat exchanger and a cold side heat exchanger connected to respective ends of the device.

18. The refrigeration device according to claim 17, wherein the heat exchangers are arranged such that the cold end is kept in contact with the surroundings and the hot end is used to heat whereby the device operates as heat pump.

19. The refrigeration device according to claim 17, wherein h at least one of the heat exchangers is integrated in one of the flow distributors.

20. The refrigeration device according to claim 1, wherein the magnetocaloric bed and the magnetic field source are arranged substantially coaxially, the magnetic field source being arranged within the cylinder of the magnetocaloric bed.

21. The refrigeration device according to claim 1, wherein the magnetocaloric bed and the magnetic field sources are arranged substantially coaxially, the magnetocaloric bed being arranged within the magnetic field source.

22. A method of refrigeration, the method comprising:
   providing a magnetic field source and a magnetocaloric bed, one surrounding the other and being arranged for relative rotation;
   providing a flow distributor at each end of the magnetocaloric bed for controlling the part of the magnetocaloric bed able to receive working fluid during a cycle of operation in which each flow distributor has at least two openings and is fixed with respect to the magnetic field source such that as the magnetocaloric component moves relative to the flow distributors, the part of the magnetocaloric bed exposed to the openings changes wherein the flow through each of the openings is unidirectional;

forcing a liquid refrigerant to flow through the flow distributors and the magnetocaloric bed as the magnetic field source and the magnetocaloric bed rotate continuously relative to each other to thereby cause the fluid to be heated or cooled.

23. The method of according to claim 22, comprising:

providing in communication with one end of the magnetocaloric bed a hot side heat exchanger to remove heat from the heated fluid, and providing in communication with the other end of the magnetocaloric bed a cold side heat exchanger to absorb heat from the environment.

24. The method according to claim 22, wherein the fluid is forced into or out of the magnetocaloric bed in the same direction with respect to the common axis, irrespective of the stage of the AMR cycle at which the fluid is actually moving.

25. The method according to claim 22, wherein the method is executed using a refrigeration device according to claim 1.

* * * * *